United States Patent [19]

Scrivano

[11] Patent Number: 5,316,873
[45] Date of Patent: * May 31, 1994

[54] POSITION ADJUSTABLE BATTERY ADAPTER

[76] Inventor: Thomas J. Scrivano, 976 Mission Dr., #4, Costa Mesa, Calif. 92626-4228

[*] Notice: The portion of the term of this patent subsequent to Feb. 16, 2010 has been disclaimed.

[21] Appl. No.: 5,009

[22] Filed: Jan. 15, 1993

Related U.S. Application Data

[63] Continuation-in-part of Ser. No. 594,552, Oct. 9, 1990, Pat. No. 5,187,026.

[51] Int. Cl.$^5$ .............................................. H01M 2/10
[52] U.S. Cl. ...................................... 429/96; 429/100
[58] Field of Search ................................. 429/96, 100

[56] References Cited

U.S. PATENT DOCUMENTS

| | | |
|---|---|---|
| 2,522,660 | 9/1947 | Bledsoe . |
| 3,301,712 | 1/1964 | Bach . |
| 3,880,673 | 4/1975 | Buhrer . |
| 3,990,919 | 11/1976 | Krueger ............................ 429/100 |
| 3,998,516 | 12/1976 | Mabuchi ........................... 429/100 |
| 4,223,076 | 9/1980 | Terada ............................... 429/96 |
| 4,397,920 | 8/1983 | Trattner ............................ 429/100 |
| 4,718,742 | 1/1988 | Utoh .................................. 429/96 |
| 4,731,306 | 3/1988 | Dumbser ........................... 429/98 |
| 4,767,358 | 8/1988 | Nullmeyer ....................... 439/500 |
| 4,842,966 | 6/1989 | Omori ................................ 429/96 |
| 4,873,160 | 10/1989 | Miyazaki ........................... 429/170 |
| 4,992,987 | 2/1991 | Echols .............................. 429/96 |
| 5,187,026 | 2/1993 | Scrivano ........................... 429/96 |

Primary Examiner—José G. Dees
Assistant Examiner—Samuel Barts
Attorney, Agent, or Firm—Roy A. Ekstrand

[57] ABSTRACT

A battery adapter provides a housing having an outer shape corresponding to a pair of juxtaposed standard cylindrical type battery cells. A pair of electrical contacts are supported upon the housing to provide electrical connection to environments which would normally receive a pair of standard cylindrical type cells or combinations thereof. A long life battery having a voltage approximately double that of a standard one and a half volt battery is supported within the housing and electrical connections are provided between the terminals of the internal battery and the external terminals supported on the housing. Embodiments are shown in which the internal battery may be replaced. Embodiments which replicate either parallelly arranged or serially arranged cell combinations are shown. In an alternate embodiment, the battery adapter includes a pair of cylindrical housings having inwardly facing cavities which receive a portion of a disk-shaped battery and a pair of contact springs on opposite sides of the disk-shaped battery for mechanical and electrical connection between the adapter and the disk-shaped battery.

11 Claims, 4 Drawing Sheets

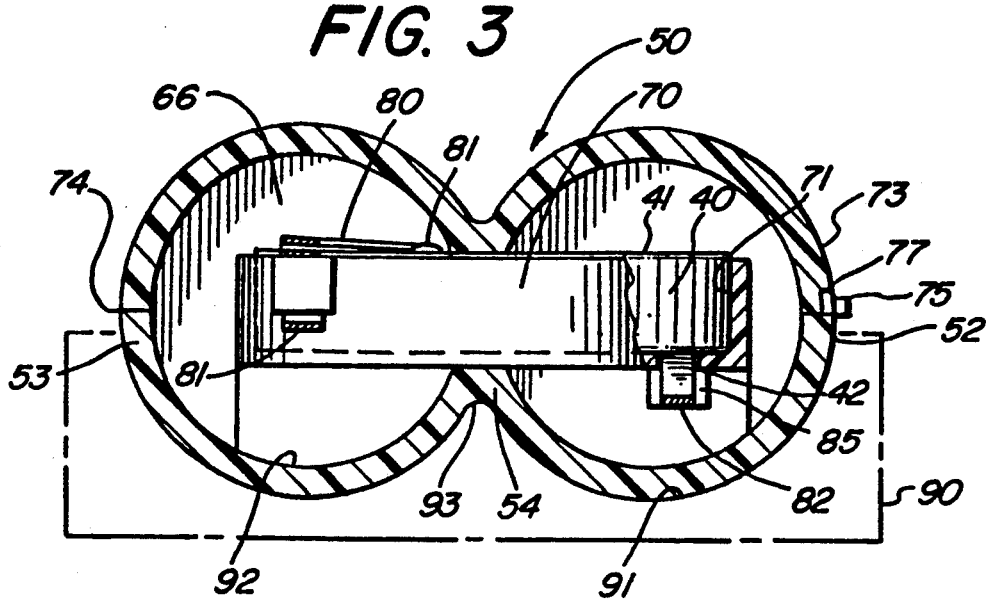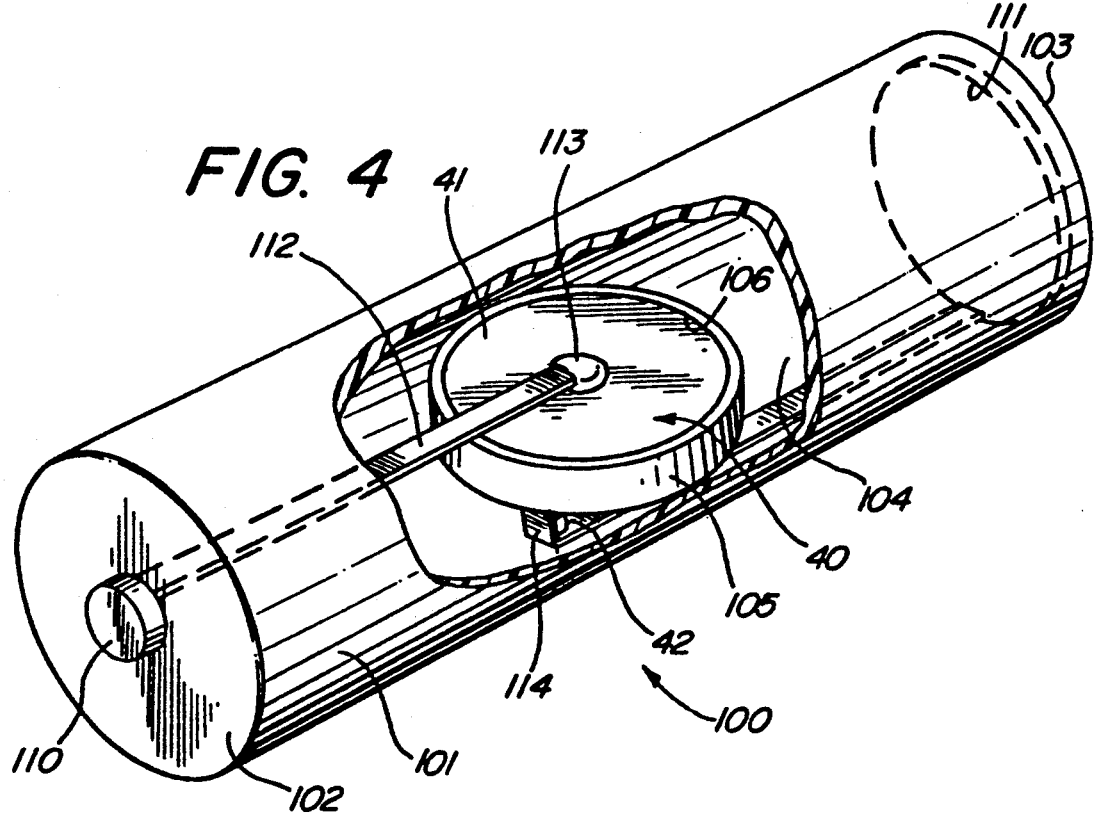

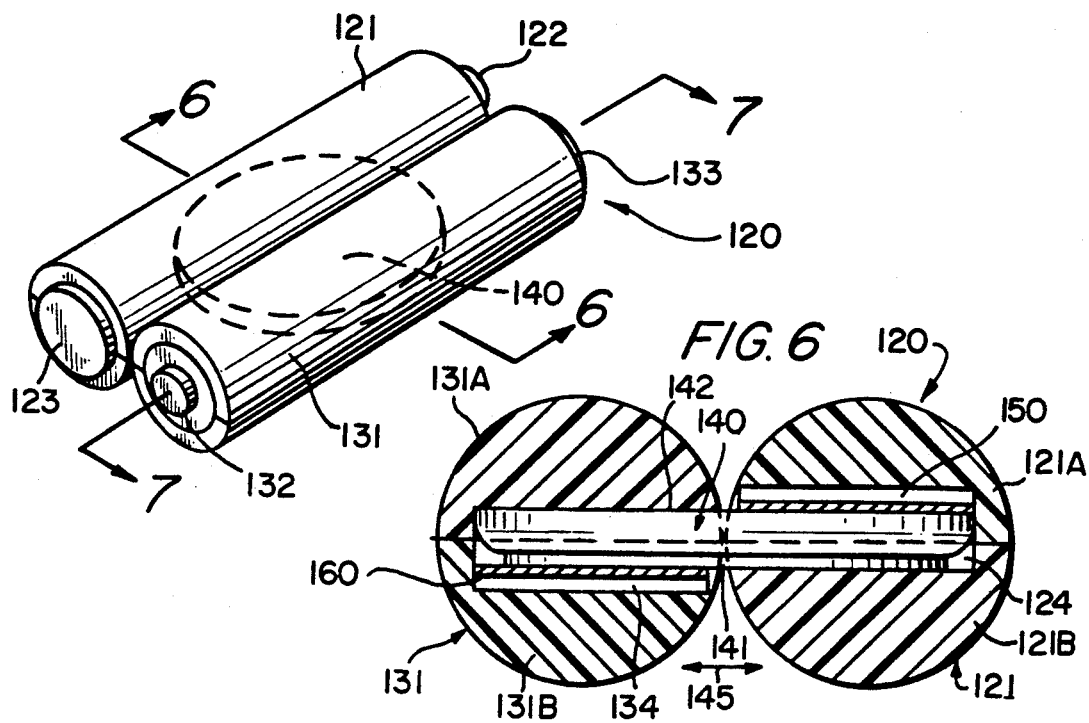
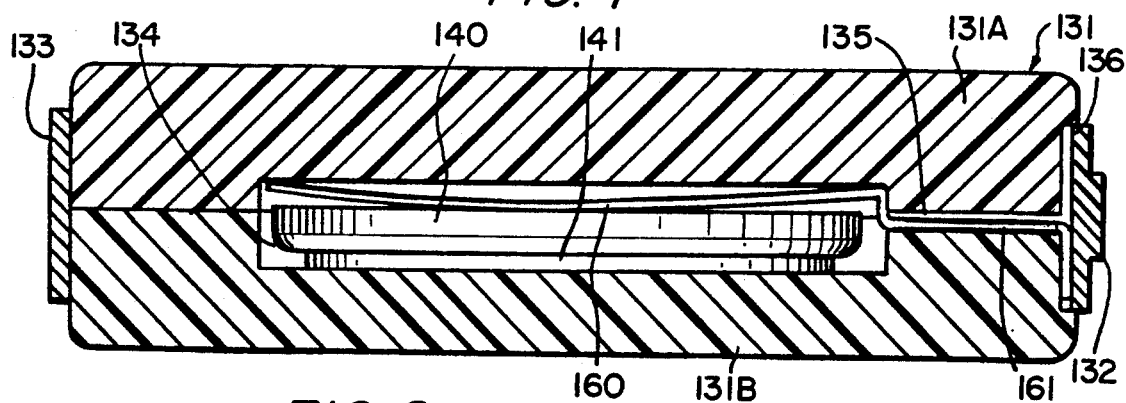
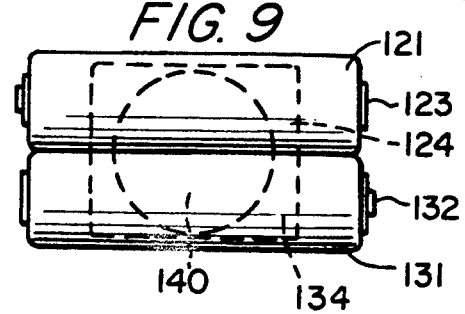
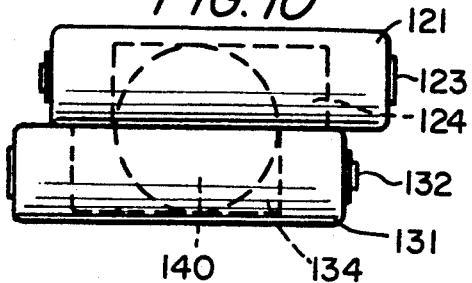

POSITION ADJUSTABLE BATTERY ADAPTER

CROSS REFERENCE TO RELATED APPLICATION

This application is a continuation-in-part of a copending application entitled BATTERY ADAPTER having Ser. No. 07/594,552 filed Oct. 9, 1990, now U.S. Pat. No. 5,187,026 in the name of the applicant in the present application.

FIELD OF THE INVENTION

This invention relates generally to batteries and particularly to those used in a low power long life environment.

BACKGROUND OF THE INVENTION

Through the years the majority of batteries used to provide a mobile source of electrical DC power for the virtually endless array of battery powered devices have resulted in the proliferation of batteries in certain standard size units. The most common types of commercially available batteries are those generally designated as A, AA, AAA, C, and D cells. Such standard battery cells are usually alkaline electrochemical sources or the like and produce an electrical voltage of approximately 1.5 volts per cell. In their commercially available form, such standard cells comprise a generally cylindrical elongated housing having an extending positive terminal at one end and a generally flat metallic negative terminal at the other end. To provide the variety of operating voltages for units using such basic standard cells, manufacturers typically provide battery compartments or receptors which support multiple groups of standard round cells in either series or parallel configuration.

The general operating environment for such standard battery cells may, to some extent, be divided between high power uses and low power uses. High power uses are characterized by the need to run high current apparatus such as electrical motors, heating elements and the like. Conversely, low power uses are typically found in computer type devices such as calculators, remote control units used for televisions and VCR's, smoke detectors and back-up systems or computer memories. While alkaline cells have proved satisfactory for the high power environment, they have been found less than desirable in the low power environment in that their useful life is limited. The typical alkaline cell has a life expectancy in low power or shelf life conditions of approximately one or two years at best.

A number of devices for supporting and combining such basic alkaline type cells have been provided by practitioners in the art to meet the varying needs of users. For example, U.S. Pat. No. 4,731,306 issued to Dumbser for a BATTERY ARRANGEMENT sets forth a battery arrangement used with distance and speed measuring indicators for cycles. The battery arrangement supports two batteries within a battery chamber having appropriate connections. The connections provide for battery replacement without interrupting the supply of electrical power during the battery replacement process.

U.S. Pat. No. 4,718,742 issued to Utoh, et al. sets forth a BATTERY FITTING DEVICE USABLE FOR ELECTRONIC APPLIANCE in which a battery holder is adapted to accommodate a button shaped battery which is then insertable into a holder accommodating cavity within the appliance. The battery is firmly clamped between contact leaf springs disposed in the battery accommodating cavity.

U.S. Pat. No. 2,522,660 issued to Bledsoe, Jr. sets forth a FOLDABLE HOLDER FOR FLASHLIGHT ELEMENTS in which an elongated generally planar support is formed of a foldable planar material such as rigid cardboard or the like. The folder includes spaced fold lines and interlocking tabs to provide a battery supporting cavity and means for supporting a light bulb. Electrical connections are made to complete a circuit between the battery and light bulb.

U.S. Pat. No. 4,223,076 issued to Terada sets forth a BATTERY CASING which comprises a lid closing a battery receiving chamber. The lid is directly mounted on the battery casing body thereby avoiding the use of the outer panel of the instrument which receives the battery. Electrical connections are provided to couple the appliance to the battery.

U.S. Pat. No. 4,842,966 issued to Omori, et al. sets forth a BATTERY HOLDER MECHANISM for holding a battery in an electronic device. The battery holder has a circular arc portion extending along the circumferential direction of the battery. First and second supporting projections extend from the inner peripheral edges of the circular arc portion and support the battery from both sides. Engagement pawls resiliently lock the battery holder body within the battery receiving hole. The battery is held by projections from both sides to restrict vertical displacement of the battery.

While the foregoing described battery holding apparatus provide some benefit in certain uses, there remains a need in the art for a more convenient way of supplying long lasting battery power to environments of low power use.

SUMMARY OF THE INVENTION

Accordingly, it is a general object of the present invention to provide an improved device for supplying electrical power to low power long life environments. It is a more particular object of the present invention to provide an effective alternative to conventional alkaline power cells in such low power long life environments.

In accordance with the present invention, there is provided a battery adapter comprises: a housing formed to define an outer surface corresponding generally to a pair of standard cylindrical batteries and defining opposed end portions; a battery having a positive terminal and a negative terminal and means for establishing an electrical potential therebetween approximately double that of a standard cylindrical battery; a positive contact and a negative contact supported upon the end portions of the housing at positions corresponding to the positions of one positive and one negative contact terminal of a pair of standard cylindrical batteries; and means providing electrical connection between the positive contact and the positive terminal and between the negative contact and the negative terminal.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a section view of the present invention battery adapter taken along section lines 3—3 in FIG. 2;

FIG. 4 sets forth a perspective view of a still further alternate embodiment of the present invention battery adapter;

FIG. 5 sets forth a perspective view of an alternate embodiment of the present invention battery adapter;

FIG. 6 sets forth a section view of the battery adapter of FIG. 5 taken along section lines 6—6 therein;

FIG. 7 sets forth a section view of the battery adapter of FIG. 5 taken along section lines 7—7 therein;

FIGS. 9 and 10 set forth top views of the battery adapter of FIG. 5 in alternate position adjustments.

DESCRIPTION OF THE PREFERRED EMBODIMENTS

Figure 1:
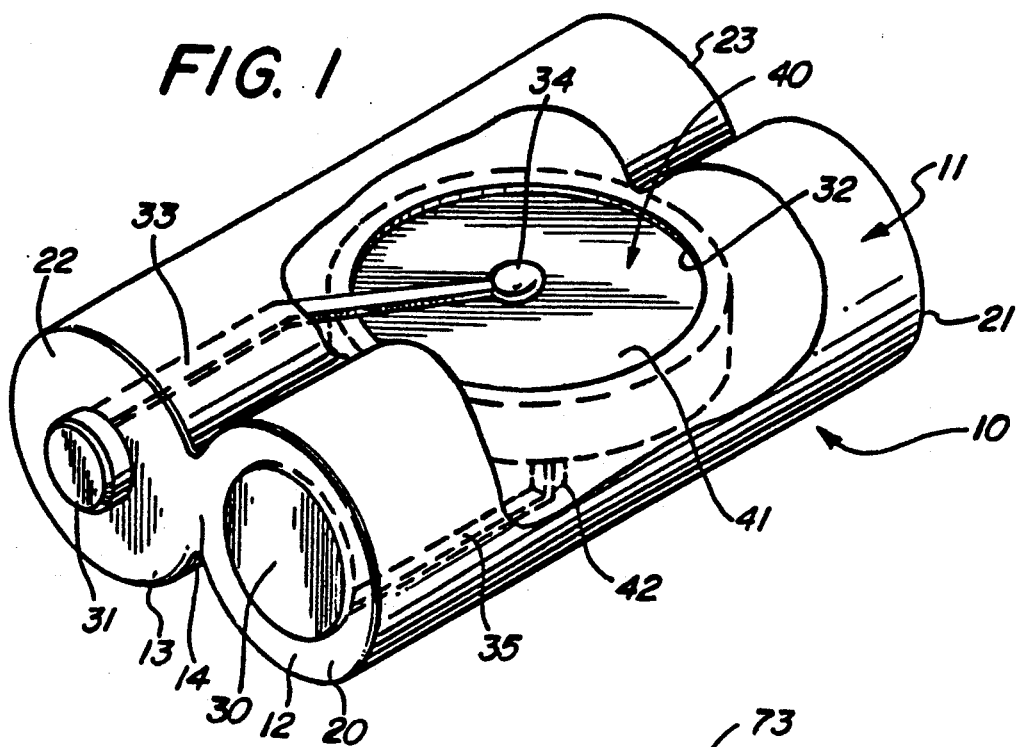
FIG. 1 sets forth a partially sectioned perspective view of a battery adapter constructed in accordance with the present invention.

FIG. 1 sets forth a perspective view of a battery adapter constructed in accordance with the present invention and generally referenced by numeral 10. Battery adapter 10 includes a housing 11 comprising a pair of cylindrical portions 12 and 13 joined by a joining portion 14. Cylindrical portion 12 defines a flat end 20 and a flat end 22 on opposed ends of cylindrical portion 12. Similarly, cylindrical portion 13 defines flat end portions 22 and 23 at opposite ends thereof. Joining portion 14 is generally co-extensive with cylindrical portions 12 and 13.

A negative electrical terminal 30 formed to correspond to the negative terminal of a standard alkaline type battery cell is supported by end portion 20 of cylindrical portion 12. A generally cylindrical outwardly extending positive electrical terminal contact 31 which is configured in correspondence to the typical positive contact of a standard alkaline type cell is supported by and extends outwardly from end portion 22 of cylindrical portion 13.

Housing 11 further defines a generally cylindrical recess 32 which is adapted to receive a lithium type battery 40. A battery 40 which comprises a disk-shaped battery such as a lithium three-volt battery defines a generally planar positive terminal 41 on one side and a downwardly extending negative terminal 42 on its underside. In accordance with the invention, battery 40 is received within recess 32 of housing 11 and is supported therein. In further accordance with the present invention, an electrical connector 33 extends within housing 11 from positive contact terminal 31 and defines a contact 34 at the opposite end thereof. Connector 33 further includes a contact 34 which in accordance with conventional fabrication techniques provides electrical connection between positive terminal 41 of battery 40 and positive contact terminal 31. A second connector 35 is coupled at one end to negative contact terminal 31 and extends within housing 11 to form electrical connection with negative terminal 42 of battery 40. In the embodiment shown in FIG. 1, housing 11 is formed of a suitable nonconductive material such as molded plastic or the like. In accordance with conventional fabrication techniques, battery 40, connector 33, connector 35 and contacts 31 and 30 may be preassembled and molded within housing 11 to form the structure shown in FIG. 1. It will be apparent to those skilled in the art that alternative molding and fabricating processes may be utilized to produce the structure shown in FIG. 1.

Battery adapter 10 forms a battery element which places a disk-shaped battery such as lithium battery 40 within a convenient housing replicating a pair of parallelly arranged standard cells such as the above-mentioned A, AA, AAA, C, and D. It will be apparent to those skilled in the art that while the embodiment of FIG. 1 replicates standard cells arranged in oppositely facing orientations, that the present invention may be equally well fabricated to replicate a pair of standard cells faced in common orientation by simply placing negative contact 30 on the opposite end of cylindrical portion 12. In any event, battery adapter 10 forms a convenient unit which may be readily substituted for a pair of conventional standard cells within the battery supporting environments of typical devices. In its most advantageous form, battery 40 comprises a three volt battery such as a lithium battery having a characteristic long life under low power uses. Such lithium batteries and other disk-shaped batteries have been conceived which exhibit low power lives in the order of five or ten years. Thus, it will be apparent to those skilled in the art that battery adapter 10 provides a superior source of electrical power in low power long life environments not realized by conventional alkaline type cells. It will be equally apparent to those skilled in the art that other long life battery cells may be substituted for the lithium cell used for battery 40 without departing from the spirit and scope of the present invention.

Figure 2:
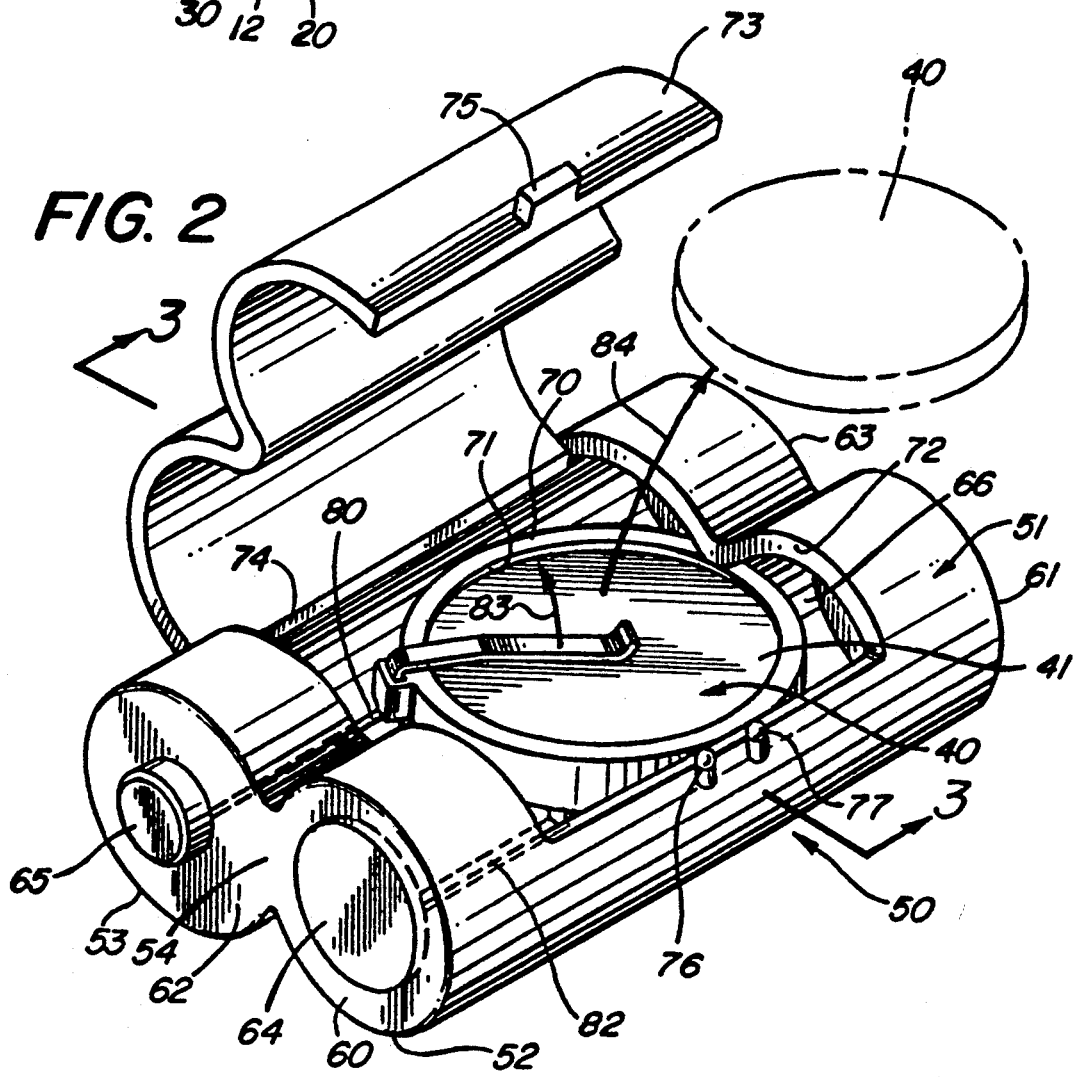
FIG. 2 sets forth a perspective view of an alternate embodiment of the present invention battery adapter.

FIG. 2 sets forth an alternate embodiment of the present invention battery adapter which permits replacement of the interior battery cell. A battery adapter 50 includes a housing 51 having a pair of parallel cylindrical portions 52 and 53. Cylindrical portions 52 and 53 are joined by a joining portion 54. Housing 51 further defines an interior cavity 66 and a door opening 72. A door 73 configured to correspond to the cylindrical juxtaposed surfaces of cylindrical portions 52 and 53 and joining portion 54 is pivotally secured to door opening 72 by a hinge 74. While a number of hinges may be used to pivotally support door 73, it has been found advantageous to use a thin plastic living hinge member which is integral with door 73. In alternative, it will be recognized at any number of interlocking hinges or attachments for pivotal attachment of door 73 to housing 51 may be used. Door 73 further defines a generally rectangular tab 75. Correspondingly, housing 51 defines a pair of spaced apart snap-lock posts 76 and 77. Posts 76 and 77 and tab 75 cooperate to provide a snap-lock attachment which maintains door 73 in a closed position within door opening 72.

A generally cylindrical battery support 70 is formed within interior cavity 66 of housing 51 and defines a cylindrical battery recess 71. A contact terminal 65 which replicates the positive terminal of a conventional alkaline type cell is supported upon end portion 62 of cylindrical portion 53. A connector 80 extends from terminal 65 inwardly and defines a contact 81 which is supported above battery recess 71. A contact terminal 64 which replicates the negative terminal of a conventional alkaline type cell is supported upon end portion 60 of cylindrical portion 52. A connector 82 extends inwardly from contact terminal 64 and terminates in an electrical connection 85 (seen in FIG. 3). A battery 40, which comprises in its preferred form a disk-shaped lithium battery, is received within battery recess 71 of battery support 70. In accordance with conventional fabrication techniques, lithium battery 40 includes a planar positive terminal 41 on its upper side and a downwardly extending negative terminal 42 (seen in FIG. 3).

In accordance with the present invention, connector 80 is pivoted in the direction indicated by arrow 83 to expose battery recess 71 in a sufficient manner to permit lithium battery 40 to be placed therein. Lithium battery 40 is placed within battery recess 71 such that negative terminal 42 is received by connector 85 (seen in FIG. 3). Thereafter, connector 80 is released and the spring force thereof urges contact 81 against positive terminal 41 to provide electrical connection between positive terminal 41 of battery 40 and positive contact terminal 65. With battery 40 thus installed, door 73 is pivoted about hinge 74 until tab 75 is received within and secured by snap-lock posts 76 and 77.

With battery 40 installed and door 73 closed, battery adapter 50 is ready to be placed within any operative environment which would normally receive a pair of standard cells in a parallel or side by side arrangement. Again, as described above in FIG. 1, the placement of positive contact terminal 65 and negative contact terminal 64 upon housing 51 may be varied to provide units which make electrical connection in a different manner than the side by side connection anticipated in FIGS. 1 and 2. When it is desired to replace battery 40, battery adapter 50 is removed from the host device and door 73 is opened to the position shown in FIG. 2. Thereafter, connector 80 is again pivoted away from positive terminal 41 and battery 40 is removed from recess 71 in the direction indicated by arrow 84. Thereafter, a replacement for battery 40 may be installed and door 73 closed once again.

FIG. 3 sets forth a section view of battery adapter 50 taken along section lines 3—3. Accordingly, battery adapter 50 defines cylindrical portions 52 and 53 joined by joining portion 54. Cylindrical portions 52 and 53 together with joining portion 54 form housing 51 which defines an interior cavity 66. A battery support 70 is formed within interior cavity 66 and defines a battery recess 71. Recess 71 supports connector 82 having an upwardly extending connection socket 85 coupled thereto. Connector 80 extends inwardly as seen in FIG. 2 and is supported upon battery support 70. Connector 80 terminates in a contact 81. A lithium type battery 40 having a downwardly extending negative terminal 42 and a planar positive terminal 41 is received within battery recess 71 such that negative terminal 42 is received within socket 85 and contact 81 forms electrical connection with terminal 41 thereof. Housing 51 defines a door portion 73 having an outwardly extending tab 75 and a hinge 74 pivotally securing door 73 to housing 51. Thus, in the position shown in FIG. 3, door 73 is closed and battery 40 is supported within battery support 70 to form the above-described structure shown in FIG. 2. For purposes of illustration, an exemplary battery case 90 is shown in dashed line outline to illustrate a typical battery receptacle of the type which receives a pair of standard alkaline type cells in parallel arrangement. Thus, battery case 90 provides a pair of parallel cylindrical cradle portions 91 and 92 and an upwardly extending intervening ridge portion 93. In accordance with an important aspect of the present invention, housing 51 is configured such that battery adapter 50 is easily received in battery case 90 in the sam manner as a pair of parallelly arranged standard cells.

FIG. 4 sets forth a still further alternate embodiment of the present invention which may be substituted for a pair of standard cells arranged in an in-line series configuration. Thus, battery adapter 100 includes an elongated generally cylindrical housing 101 having planar end portions 102 and 103. End portion 102 supports a contact 110 configured to replicate the positive terminal of a standard alkaline type cell. A contact 111 is supported upon end 103 and is configured to replicate the negative terminal of a standard alkaline type cell. Housing 101 defines an interior 104 which includes a battery support 105 therein. Support 105 may be joined to housing 101 in accordance with conventional fabrication techniques and defines a generally cylindrical battery recess 106. Recess 106 receives a disk-shaped lithium type battery 40. Battery 40 includes a planar positive terminal 41 and a downwardly extending negative terminal 42. A connector 112 extends inwardly from contact 110 and terminates in a contact 113 which forms an electrical connection to positive terminal 41 of battery 40. A connector 114 extends inwardly from negative contact 111 and forms an electrical connection to negative terminal 42 in accordance with conventional fabrication techniques.

It will be apparent to those skilled in the art that while FIG. 4 sets forth an embodiment in which housing 101 defines an interior cavity, battery 40 may be supported within housing 101 in the manner described above for the embodiment of FIG. 1 in which battery 40 is molded into housing 101. Alternatively, a door similar to door 73 of the embodiment of FIG. 2 may be provided to permit access to battery 40 and replacement thereof. Battery adapter 40 provides a source of electrical power which may be substituted for a pair of standard battery cells arranged in a series configuration. Thus, in its preferred form, battery adapter 100 defines a length approximately equal to the length of two standard alkaline type cells.

FIG. 5 sets forth a perspective view of a position adjustable battery adapter constructed in accordance with the present invention and generally referenced by numeral 120. Adapter 120 includes a generally cylindrical battery housing 121 supporting a simulated positive terminal 122 and a negative terminal 123. Adapter 120 further includes a cylindrical battery housing 131 supporting a positive terminal 132 and a simulated negative terminal 133. In accordance With the structures set forth below in greater detail, battery housings 121 and 131 define interior cavities 124 and 134 respectively (seen in FIG. 6) facing inwardly to receive a disk-shaped lithium type battery 140. By means set forth below in greater detail, negative terminal 123 is operatively coupled to negative side 141 of battery 140 while positive terminal 132 is operatively coupled to the positive side of battery 141. Terminals 122 and 133 are inoperative and unconnected in the configuration of adapter 120 shown in FIG. 5. Battery housings 121 and 131 are formed of a insulative material such as molded plastic material or the like to provide an insulating housing for battery 140 and to support terminals 133 and 132. Thus, in accordance with the anticipated use of the present invention battery adapter shown in FIG. 5, the assembled combination of housings 121 and 131 together with battery 140 are received within a typical battery utilization device. The embodiment of the present invention battery adapter set forth in FIG. 5 is configured and sized to replace a pair of AA batteries and provide an equivalent voltage using a long life low current drain type battery for battery 140 such as a lithium type battery or its equivalent.

FIG. 6 sets forth a section view of battery adapter 120 taken along section lines 6—6 in FIG. 5. As set forth therein, battery adapter 120 is formed by a pair of generally cylindrical battery housings 121 and 131 which define inwardly facing interior cavities 124 and 134 respectively. In its preferred form, battery housings 121 and 131 are fabricated of molded plastic material or the like and each comprise a pair of semicylindrical mating half portions. Thus, battery housing 121 is preferably formed of a pair of semicylindrical mating portions 121A and 121B while battery housing 131 is formed of a pair of semicylindrical mating housing portions 131A and 131B. Battery housing 121 supports a resilient contact spring 150 (better seen in FIG. 8) while battery housing 131 supports a resilient contact spring 160 (also better seen in FIG. 8). Disk-shaped battery 140 defines a generally planar negative battery terminal side 141 and a positive battery terminal side 142. In accordance with an important aspect of the present invention, disk-shaped battery 140 is received within interior cavities 124 and 134 of battery housing 121 and 131 respectively and is captivated therein by contact springs 150 and 160. As can be seen, contact spring 150 is forced against and forms electrical contact with negative battery terminal side 141 of battery 140 while contact spring 160 is forced against and provides electrical contact with positive terminal 142 of disk-shaped battery 140.

In accordance with an important aspect of the present invention, the spring forces of contact springs 150 and 160 provide frictional grasping of battery 140. Thus, in accordance with an important aspect of the present invention, the relative positions of battery housings 121 and 131 may be adjusted to provide greater separation by drawing them outwardly in the directions indicated by arrows 145 to accommodate different battery spacing within a battery utilization device. In addition and as is better set forth below in FIGS. 9 and 10, the lateral positions of battery housings 121 and 131 may also be adjusted by sliding housings 131 and 121 with respect to disk-shaped battery 140.

FIG. 7 sets forth a section view of battery housing 131 taken along section lines 7—7 in FIG. 5. As described above, battery housing 131 is preferably formed of a pair of mating molded plastic housings 131A and 131B. When assembled or mated in the assembly shown in FIGS. 5, 6 and 7, housing portions 131A and 131B combine to form housing 131 which defines an interior cavity 134 and a contact recess 136. A channel 135 is formed between housing portions 131A and 131B and extends from interior cavity 134 to contact recess 136. A spring clearance notch 138 is formed at the inner end of channel 135. A curved resilient contact spring 160 defines a connecting tab 161 and is received within interior cavity 134 such that connecting tab 161 rises through notch 138 and passes through channel 135 into recess 136. Contact spring 160 is positioned within interior cavity 134 to form a downwardly curved convex spring. In accordance with the structure set forth above, a portion of disk-shaped battery 140 is received within interior cavity 134 and is oriented such that positive contact 142 faces upwardly and is contacted by spring 160. A positive terminal 132 is received partially within recess 136 and is electrically connected to a portion of connecting tab 161 using conventional attachment means such as pressure contact, spot welding or the like. As a result, contact spring 160 forms an electrical connection between positive terminal 142 of battery 140 and positive terminal 132 of battery adapter 120. It will be apparent from FIGS. 6 and 7 that a similar cooperation exists between contact spring 150 within battery housing 121, negative battery terminal side 141 of battery 140, and negative terminal 123 of battery adapter 120. Thus, with temporary reference to FIG. 5, battery 140 is operatively coupled with its negative terminal coupled to terminal 123 of adapter 120 and its positive terminal coupled to terminal 132 of adapter 120. A simulated negative terminal 133 is secured to the remaining end of battery housing 131 to provide mechanical correspondence with a typical AA battery but is not operatively coupled to battery 140.

FIGS. 9 and 10 set forth battery adapter 120 having disk-shaped battery 140 received therein in the matter described above. The operative importance of FIGS. 9 and 10 is to facilitate the position adjustment capabilities of battery adapter 120. Thus, as can be seen in FIGS. 9 and 10 in which battery housings 121 and 131 are shown in parallel position having inwardly facing battery cavities 124 and 134, disk-shaped battery 140 is substantially smaller than the width of cavities 124 and 134. Thus, as is best seen in FIG. 10, the relative positions of battery housings 121 and 131 may be offset while still maintaining their operative closure about battery 140. This permits battery adapter 120 to accommodate substantial variation in the battery receptacle configuration of a battery utilization device.

Figure 8:
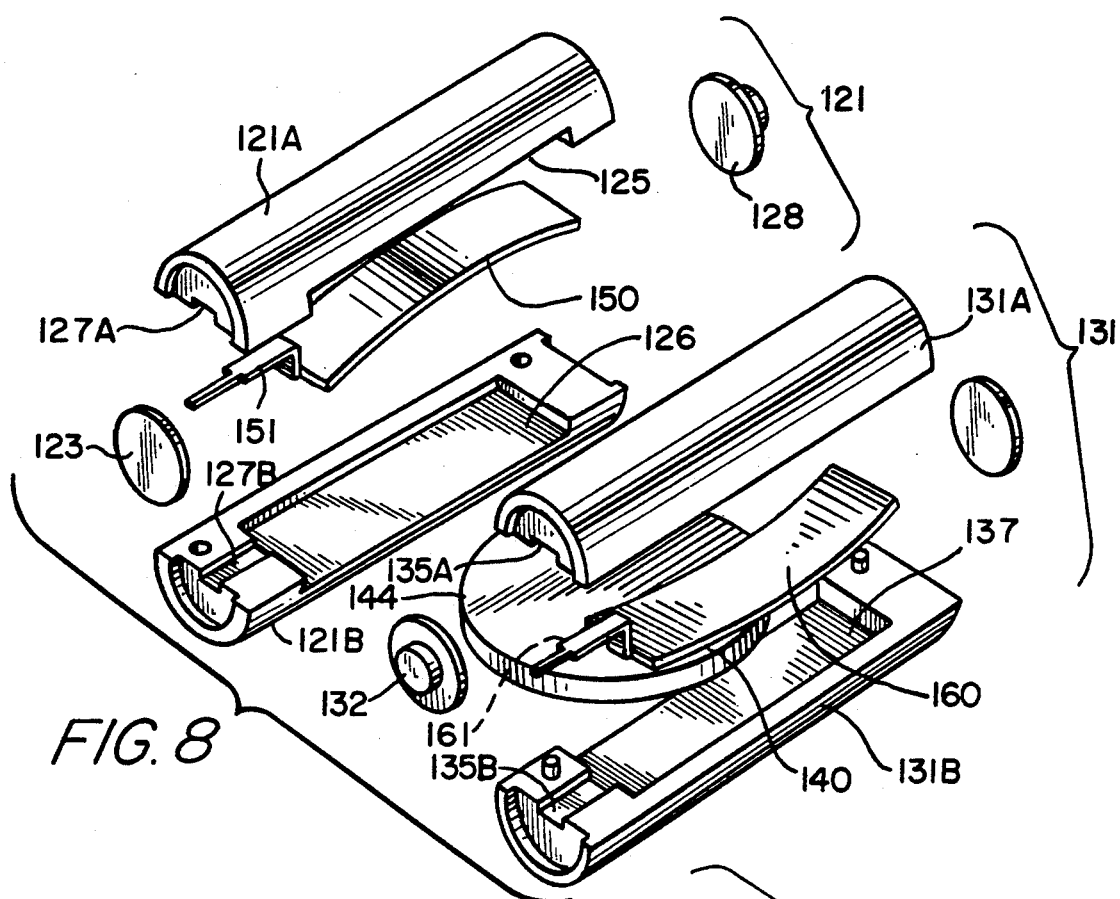
FIG. 8 sets forth a perspective assembly view of the battery adapter of FIG. 5.

FIG. 8 sets forth a perspective assembly view of battery adapter 120 together with disk-shaped battery 140. As described above, battery adapter 120 includes a generally cylindrical battery housing 121 formed of a pair of cylindrical half portions 121A and 121B together with a generally cylindrical battery housing 131 formed of a pair of semicylindrical half portions 131A and 131B. Half portion 121A defines an inwardly facing opening 125 having a channel portion 127A extending therefrom. Similarly, half portion 121B defines an opening 126 having a channel portion 127B extending therefrom. As is set forth above, when half portions 121A and 121B are mated, channel portions 127A and 127B form channel 127 while openings 125 and 126 form interior cavity 124. A contact spring 150 defines a resilient upwardly curved spring member having a connecting tab 151 extending through channel 127 and forming electrical contact with a generally disk-shaped negative terminal 123. A simulated positive terminal 122 is secured to the remaining end of battery housing 121 to provide appropriate mechanical fit within the battery utilization device. A spring clearance notch 129 provides clearance for tab 151.

Similarly, half portion 131A of battery housing 131 defines an opening similar to opening 125 of half portion 121A and a channel portion 135A. Half portion 131B defines an opening 137 having a channel portion 135B extending therefrom. When half portions 131A and 131B are combined to form housing 131, cavity 134 and channel 135 are formed by opening 137 and the corresponding opening (not shown) within half portion 131A while channel 135 is formed of the combination of channel portions 135A and 135B. Contact spring 160 comprises a resilient downwardly curved spring received within opening 137 and having a connecting tab 161 which extends through notch 138 and channel 135 and which is secured to positive terminal 132.

Disk-shaped battery 140 is received within opening 126 above contact spring 150 and within opening 137 beneath contact spring 160 in the above-described captivating assembly which couples negative terminal side 141 of battery 140 to terminal 123 and positive battery terminal 142 to positive terminal 132. With the assembly thus completed, battery adapter 120 assumes the configuration shown in FIG. 5.

Figure 11:
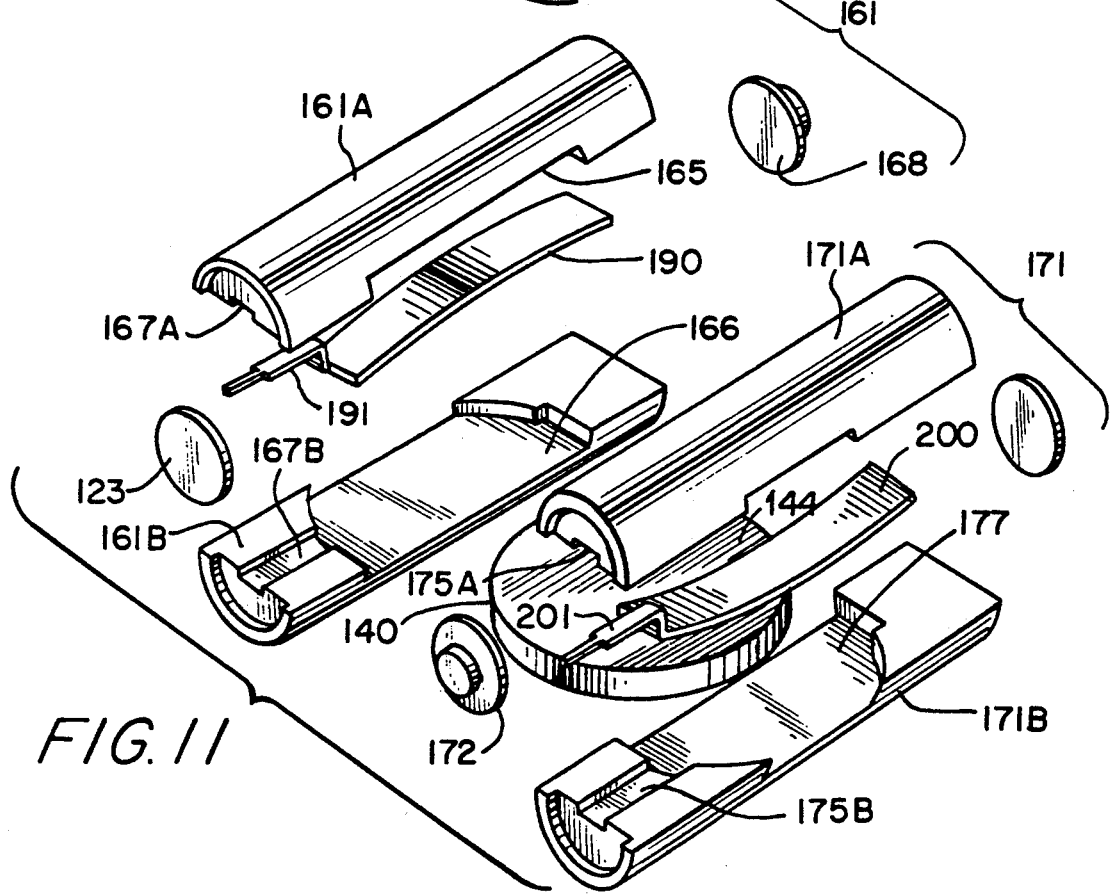
FIG. 11 sets forth a perspective assembly view of a still further alternate embodiment of the present invention battery adapter.

FIG. 11 sets forth a perspective assembly view of an alternate embodiment of the present invention battery adapter together with disk-shaped battery 140 which is generally referenced by numeral 170 and which replaces a pair of standard AAA batteries. In a similar manner to the embodiment set forth above in FIG. 8, battery adapter 170 includes a generally cylindrical battery housing 161 formed of a pair of cylindrical half portions 161A and 161B together with a generally cylindrical battery housing 171 formed of a pair of semicylindrical half portions 171A and 171B. Half portion 161A defines an inwardly facing opening 165 having a channel portion 167 extending therefrom. Similarly, half portion 161B defines an opening 166 having a channel portion 167B extending therefrom. In further similarity to adapter 120 set forth above, when half portions 161A and 161B are mated, channel portions 167A and 167B form channel 167 while Openings 165 and 166 form a similar interior cavity 164. A contact spring 190 defines a resilient upwardly curved spring member having a connecting tab 191 extending through channel 167 and forming electrical contact with a generally disk-shaped negative terminal 163. A simulated positive terminal 168 is secured to the remaining end of battery housing 161 to provide appropriate mechanical fit within the battery utilization device.

Similarly, half portion 171A of battery housing 171 defines an opening similar to opening 165 of half portion 161A and a channel portion 175A. Half portion 171B defines an opening 177 having a channel portion 175B extending therefrom. When half portions 171A and 171B are combined to form housing 171, cavity 174 and channel 175 are formed by opening 177 and the corresponding opening (not shown) within half portion 171A while channel 175 is formed of the combination of channel portions 175A and 175B. Contact spring 200 comprises a resilient downwardly curved spring received within opening 177 and having a connecting tab 201 which extends through channel 175 and is secured to positive terminal 172.

Disk-shaped battery 140 is received within opening 166 of housing 161 above contact spring 190 and within opening 177 beneath contact spring 200 in the above-described captivating assembly. Spring 190 couples negative terminal side 141 of battery 140 to negative terminal 163 while spring 200 couples positive battery terminal 142 of battery 140 to positive terminal 172. With the assembly thus completed, battery adapter 170 assumes the configuration shown in FIG. 5.

What has been shown is an economical, easy to utilize battery adapter which permits the replacement of a pair of standard cylindrical battery cells with a single integral unit having a long life type battery included therein. The invention permits the easy replacement of shorter life alkaline type batteries and the like with a longer life source of electrical power.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A battery adapter for enabling the substitution of a generally planar battery having a pair of battery terminal surfaces in place of a pair of elongated cylindrical cells, said battery adapter comprising:

a first generally cylindrical housing defining first and second ends and a first interior cavity for receiving a first portion of a generally planar battery, a first external contact terminal supported at said first end;

a first contact spring disposed within said first interior cavity and having a first electrical connection to said first external contact terminal;

a second generally cylindrical housing defining third and fourth ends and a second interior cavity for receiving a second portion of a generally planar battery;

a second external contact terminal supported at said third end; and a second contact spring disposed within said second interior cavity and having a second electrical connection to said second external contact terminal, a generally planar battery being receivable within said first and second interior cavities by insertion of said first and second portions thereof such that said first and second contact springs electrically couple the pair of battery terminal surfaces to said first and second external contact terminals.

2. A battery adapter as set forth in claim 1 wherein the generally planar battery defines opposed surfaces forming a pair of battery terminal surfaces and wherein said first and second contact springs are positioned on opposite sides of the generally planar battery.

3. A battery adapter as set forth in claim 2 wherein said first and second contact springs define resilient curved portions extending into said first and second interior cavities against the pair of terminal surfaces.

4. A battery adapter as set forth in claim 3 wherein said first and second generally cylindrical housings are each formed of generally mirror image half portions.

5. A battery adapter as set forth in claim 1 further including first and second simulated contact terminals at said second and fourth ends respectively.

6. A battery adapter as set forth in claim 5 wherein the generally planar battery defines opposed surfaces forming a pair of battery terminal surfaces and wherein said first and second contact springs are positioned on opposite sides of the generally planar battery.

7. A battery adapter as set forth in claim 6 wherein said first and second contact springs define resilient curved portions extending into said first and second interior cavities against the pair of terminal surfaces.

8. A battery adapter as set forth in claim 1 wherein said first and second interior cavities each define widths substantially greater than the widths of the first and second portions of a generally planar battery to permit a generally cylindrical housings to be movable to an offset alignment.

9. A battery adapter for enabling the substitution of a generally planar battery having a pair of battery terminal surfaces in place of a pair of elongated cylindrical cells, said battery adapter comprising:

a pair of generally cylindrical housings each defining an interior cavity for receiving opposed portions of a generally planar battery such that the generally planar battery bridges between said housings;

a pair of external contacts supported by said housings; and contact means for electrically coupling the pair of battery terminal surfaces to said pair of external contacts.

10. A battery adapter as set forth in claim 9 wherein said connecting means include:

a pair of curved resilient contact springs disposed within said interior cavities; and a pair of connecting tabs coupling said pair of contact springs to said pair of external contacts.

11. A battery adapter as set forth in claim 10 wherein the generally planar battery is generally disk-shaped having a pair of battery terminal surfaces disposed on opposite sides thereof and wherein said pair of contact springs are oppositely curved and disposed on opposite sides of the generally planar battery.

* * * * *